United States Patent [19]
Greve

[11] Patent Number: 5,219,041
[45] Date of Patent: Jun. 15, 1993

[54] DIFFERENTIAL PRESSURE SENSOR FOR SCREW COMPRESSORS

[75] Inventor: James E. Greve, South Bend, Ind.

[73] Assignee: Johnson Service Corp., Milwaukee, Wis.

[21] Appl. No.: 892,267

[22] Filed: Jun. 2, 1992

[51] Int. Cl.[5] .............................................. F01M 1/20
[52] U.S. Cl. ................................. 184/108; 184/6.4;
 73/722; 336/30; 338/42; 340/626
[58] Field of Search ............... 340/626, 451; 417/13,
 417/19, 38, 44; 184/6.4, 108; 73/722, 728;
 336/30; 338/12, 32 H, 36, 42

[56] References Cited

U.S. PATENT DOCUMENTS

| | | | |
|---|---|---|---|
| 2,692,501 | 10/1954 | Erwood | 73/722 |
| 3,884,079 | 5/1975 | Turtle et al. | 73/722 |
| 4,381,678 | 5/1983 | Lombard et al. | 336/30 |
| 4,449,112 | 5/1984 | Gould | 338/42 |
| 4,551,069 | 11/1985 | Gilmore | 417/13 |
| 4,672,231 | 6/1987 | Sutton et al. | 307/118 |
| 5,024,294 | 6/1991 | Van Fossen et al. | 184/108 |

*Primary Examiner*—Ira S. Lazarus
*Assistant Examiner*—Alan B. Cariaso
*Attorney, Agent, or Firm*—Foley & Lardner

[57] ABSTRACT

A pressure sensor, such as the type of sensor used in screw-type refrigeration compressors, permits sensing of positive as well as negative pressures and provides an indication of the direction in which the compressor is rotating. Negative pressure leads to system shut-down, while positive pressure verification will allow compressor operation to continue. The pressure sensor includes a pair of adjustable tension springs, on opposite sides of the diaphragm, to vary the position of the diaphragm within its mechanical stroke. By establishing a pressure range of interest, and by employing an electrical sensor, such as a Hall effect sensor, the direction of movement of the diaphragm and sensor can be monitored immediately upon compressor start-up.

12 Claims, 3 Drawing Sheets

DIFFERENTIAL PRESSURE SENSOR FOR SCREW COMPRESSORS

BACKGROUND OF THE INVENTION

1. Field of the Invention

The present invention relates generally to pressure sensors and, more particularly, to sensors used to determine the pressure of an operating device, such as a screw-type refrigeration compressor. In its most preferred embodiment, the present invention is utilized with refrigeration compressors to determine whether the compressor, after stat-up, is operating in a positive or negative mode.

2. Description of the Prior Art

Differential pressure sensors are known. In commonly owned U.S. Pat. No. 5,024,294, issued Jun. 18, 1991, Van Fossen, et al. describe a "Differential Pressure Transducer" which includes a housing forming a high pressure chamber, with a nozzle mounted on the housing at one end of the chamber, a diaphragm mounted in the chamber to form a low pressure chamber in the nozzle, a spring retainer in the high pressure chamber, a spindle connected to the diaphragm, a tension spring connecting the spindle to the spring retainer, a circular magnet mounted on the spindle, and a transducer mounted on the housing to sense the position of the magnet. In this device, only positive pressures could be sensed, i.e. pressures exceeding 0 psig. While such sensor has been acceptable in its field of use, the sensor is incapable of determining negative pressures, such as negative pressures occurring when the compressor rotates in the wrong direction. It would be advantageous to be able to determine the direction of rotation, because when a screw compressor is driven by a three-phase electric motor, it is possible to start the compressor in either direction. Although typically this will not be detrimental to the compressor itself, the refrigeration system with which the compressor is used will not function properly. If a system were designed which could determine whether the pressure was positive or negative at start-up, it would be possible to verify positive pressure and, through a logic circuit after start-up, allow compressor operation to continue. On the other hand, if a negative pressure was sensed in the same time frame, the logic circuit could be designed to shut down the compressor and allow a restart after appropriate corrective action has been taken.

In large, sealed refrigeration compressor systems, it is conventional to monitor lubrication pressure generated by the compressor oil pump to prevent compressor operation when there is insufficient lubrication. The absence of sufficient lubrication can cause premature wear or, in extreme cases, seizing of the compressor. Generally, lubrication pressure is monitored by determining the pressure differential between the crankcase and the output or discharge side of the compressor oil pump. The difficulty in monitoring this differential is due primarily to the variation in crankcase pressures which are dependent on temperature and the type and thermal characteristics of the refrigerant system.

In U.S. Pat. No. 4,551,069, a piston is disposed in a tube separating the interior of the tube into a high pressure portion which communicates with the output of the oil pump and a low pressure portion which communicates with the suction side of the oil pump. The piston is biased by a compression spring to move into engagement with a movable contact arm for a switch which signals loss of pressure. The switch is closed whenever the discharge pressure exceeds the combined force of the compression spring and crankcase pressure. However, this arrangement results in excessive wear of the movable sensor parts due to the continuous movement of the piston with the cyclic pressure fluctuations mentioned above as well as a need for some way to prevent nuisance tripping of the compressor motor if it is to be used to control the energization of the motor as stated in the patent.

In U.S. Pat. No. 4,672,231, a shuttle is mounted within a bore in a cylindrical housing. The shuttle includes a magnet in one end and is biased by a compression spring toward the end of the bore in the cylinder. The magnet is used to operate a reed switch to turn the compressor on or off depending on the pressure differential between the discharge pressure of the oil pump and the combined force of the compression spring and the crankcase pressure. The shuttle is mounted in close contact with the bore in the cylinder to provide a circuitous high pressure flow path through the bore so that the reaction time of the shuttle is delayed in order to minimize the on and off operation of the compressor.

In both of these devices, flow is across the moving part which allows debris to collect on the inlet screen on the high pressure side of the sensor. It should also be noted that both devices use compression springs to bias the pistons and such springs are subject to buckling or uneven closure. This can produce dragging of the magnet within the inner bore causing friction and/or hysteresis.

The problems with these devices, as well as the device shown in the aforementioned Van Fossen, et al. patent, is that negative pressure cannot be sensed accurately using the same device that is used to sense the adequacy of the positive pressure. The provision of a pressure sensor which could accomplish the functions of the sensor of the aforementioned Van Fossen, et al. patent and which would also be able to provide an electrical output indicative of negative pressure, would be a substantial advance in this art.

SUMMARY OF THE INVENTION

The pressure sensing device in accordance with the present invention features a Hall effect sensor to sense the position of a magnet which is, in turn, connected to a diaphragm that responds to a differential pressure, e.g. a differential pressure between the discharge pressure of an oil pump and the crankcase pressure of a compressor. The magnet is suspended within a housing between a tension spring and the diaphragm. Movement of the magnet within the housing is therefore frictionless due to the centering action caused by the tension spring, and the device provides immediate response to variations in pressure differential.

The present invention also provides an additional tension spring, on the opposite side of the diaphragm from the tension spring used in the Van Fossen device, and features adjustability for both tension springs, whereby the diaphragm (with no pressure applied) can be positioned at any desired location along its mechanical stroke.

The present invention also features the ability to choose what the sensor can determine, vacuum only, positive pressure only, or positive and negative pressure changes.

Another feature of the invention is the ability to provide a control means which can control energization of a compressor motor based on an immediate response to a pressure drop between pressure generated by the oil pump and the combined force of the tension spring and the crankcase pressure. Another feature of the invention is the ability to utilize the electrical output from the sensor to stop the compressor if an undesirable pressure differential is noted or to allow continuing operation of the system if a desirable pressure is noted.

A further feature of the invention is the elimination of frictional forces and the movement of the magnet within the housing of the pressure sensor to even a greater extent than was possible with the prior sensor described above.

Other features of the invention will become apparent to those skilled in the art after the following detailed description of the preferred embodiment has been reviewed, along with the appended drawings and claims.

DETAILED DESCRIPTION OF THE DRAWINGS

Figure 1:
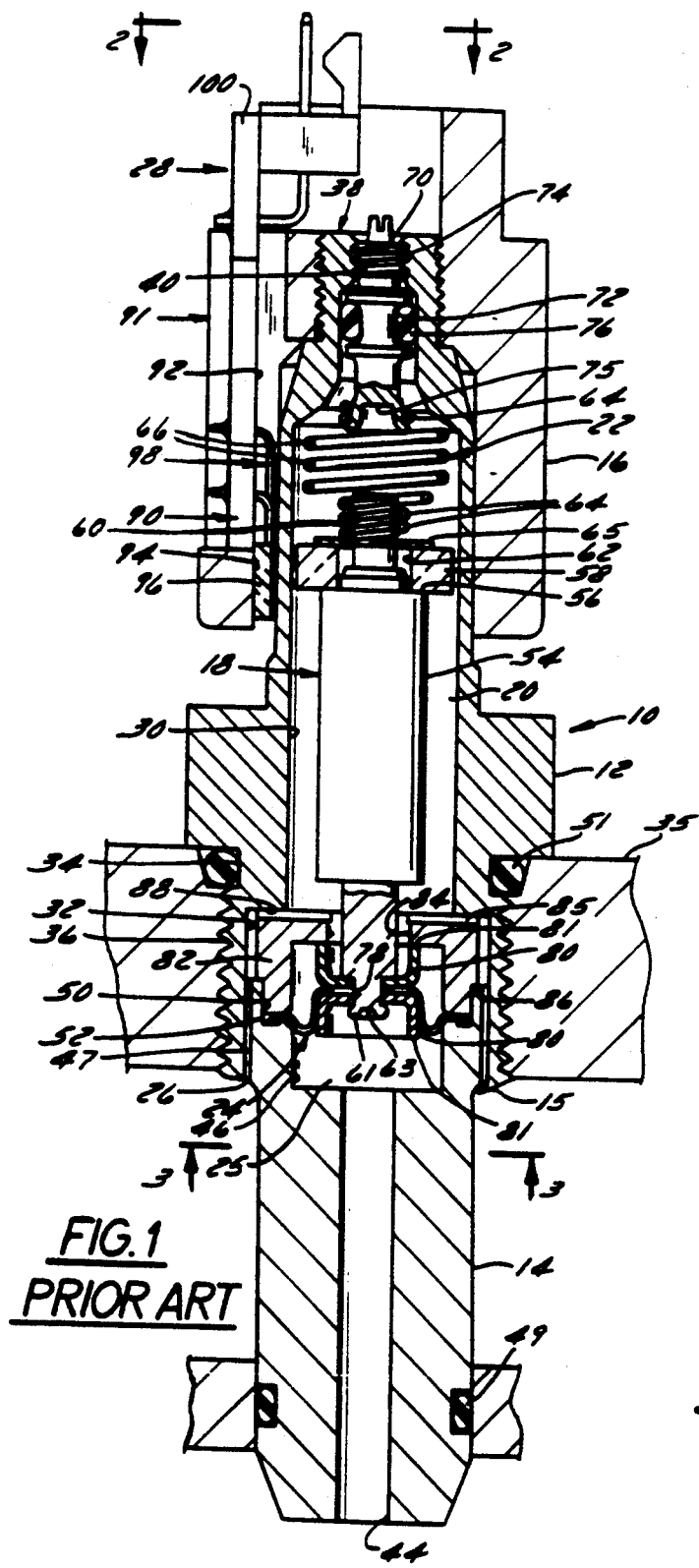
FIG. 1 is a cross-sectional view of a pressure sensor according to a prior art embodiment, shown mounted in an oil pump housing.
Figure 2:
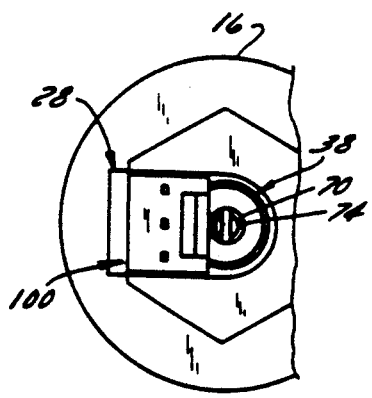
FIG. 2 is a view taken along the line 2—2 of FIG. 1, showing the connection of the Hall effect sensor to the printed circuit board.
Figure 3:
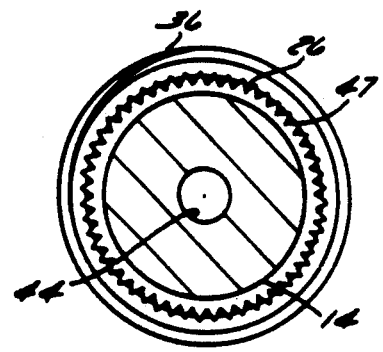
FIG. 3 is a view taken along the line 3—3 of FIG. 1, showing the high pressure inlet ports to the pressure chamber.

Before explaining the preferred embodiment of the present invention, it is to be understood that the invention is not limited in its arrangement to the details set forth in the drawings or as described in the following description. The invention is capable of other embodiments, of being used in environments other than in refrigeration compressors, and of being carried out in various ways. Also, it is to be understood that the phraseology and terminology employed herein is for purposes of description and should not be regarded as limiting.

DETAILED DESCRIPTION OF THE PREFERRED EMBODIMENT

The pressure sensing device 10 as seen in FIG. 1 is the one referred to in the previously mentioned Van Fossen, et al. patent. Its detailed description will serve as foundation for the description of the present invention. Sensor 10 includes a main body 12, a probe or nozzle 14 and a cover 16. A magnet carrier assembly 18 is suspended within a chamber 20 in the main body 12. The magnet carrier assembly 18 is supported by means of a tension spring 22 and a diaphragm 24. The diaphragm 24 separates the chamber 20 from a low pressure chamber 25 in the probe 14. High pressure fluid from the discharge side of the pump is admitted into the chamber 20 through flow paths 26 provided around the nozzle 14. Low pressure fluid is admitted to chamber 25 through bore 44 in nozzle 14. Under normal operating conditions, the high pressure fluid in chamber 20 will move the magnet carrier 18 downward in FIG. 1, overcoming the combined force of the tension spring 22 and the pressure in chamber 25. If the pressure drops in the chamber 20, the magnet carrier assembly 18 will move upward in FIG. 1. The movement of the magnet carrier assembly 18 is sensed by a Hall effect sensor assembly 28 provided in the cover 16 to turn off the compressor via an electronic control circuit (not shown) if the lubricating oil pressure drops below a predetermined minimum.

The main body 12 is generally cylindrical in form and is made from a non-magnetic material such as brass. The body includes a bore 30 which defines the pressure chamber 20 and a counter bore 32. A reduced diameter section 34 is provided at the lower end of the main body which is provided with screw threads 36 for mounting in the pump housing 35. The other end of the main body 12 is closed by a head 38 having a threaded bore 40. A plastic housing with threaded attachment to the upper portion of the main body supports the Hall effect sensor assembly 28 as described hereinafter.

The probe 14 includes the passage or bore 44 which is connected to a counter bore 46 that defines the low pressure chamber 25. A knurled section 47 is provided around the upper end of the probe 14 which forms a part of the flow path 26, as described hereinafter. A counter bore 50 is provided at the upper end of the probe to define a diaphragm seat 52. The probe 14 extends through the pump housing 35 so that the bore 44 can be connected to the crankcase. Seals 49 and 51, for example soft copper washers, are provided on probe 14 to seal the housing 35.

The magnet carrier assembly 18 includes a rod 54 having a flange 56 at one end defining a seat for a magnet 58. The magnet 58 is in the form of a ring having a center bore 62 that has a locational fit on the end of the rod 54. A threaded section 60 is provided at the upper end of the carrier 18 and a reduced diameter pin 61 is provided at the lower end. A blind bore 63 is provided in the end of pin 61.

The carrier assembly 18 is suspended in the chamber 20 between the tension spring 22 and the diaphragm 24. In this regard, the tension spring 22 is in the form of a coil spring having two small diameter coils 64 at each end and two or more large diameter coils 66 intermediate the ends. The small diameter coils 64 at the lower end are screwed onto the threaded end 60 of the rod 54. The magnet 58 is secured to the rod 54 by means of a washer 65 which is seated on the magnet by the coils 64 at the lower end of spring 22.

The small diameter coils 64 at the upper end are secured to an adjustment screw 70 which is mounted in the threaded bore 40 in the head 38. The screw 70 is provided with a groove 72 and a threaded section 74 at one end and a blind bore 75 in the other end. The adjustment screw 70 is sealed within the threaded bore 40 by means of O-ring seal 76 mounted in groove 72. The coils 64 are secured to the end of the screw 70 by expanding the edges of the blind bore 75 at the end of the screw. This allows the screw to turn within the coils of the spring 64 for adjusting the tension on spring 22.

The diaphragm 24 includes a central opening 78 and is mounted on the pin 61 at the end of the rod 54. The diaphragm is formed from a molded flexible material such as epichlorohydrin copolymer. In this regard, a pair of diaphragm retainers 80 having cup-shaped walls 81 are mounted on the rod 54 above and below the diaphragm 24. The retainers 80 are locked on the rod by expanding the end of the pin 61 around the bore 63. The retainers 80 should be clamped together with sufficient force to sealingly secure the diaphragm to the rod 54. The retainers 80 also include means for limiting the motion of the carrier assembly 18 in the housing to prevent damage to the diaphragm. Such means is in the form of the retainer walls 81 which are positioned to engage a clamp ring 82 and the end of the chamber 25 in nozzle 14.

The outer edge of the diaphragm 24 is secured to the shoulder 52 in the counter bore 50 by means of the clamp ring 82. The ring 82 includes a central bore 84 and a shoulder 86 around the outside of the ring 82. The ring 82 includes a number of slots 85 in the upper face. The ring 82 is positioned in the counter bore 50 to clamp the edge of the diaphragm 24 against the shoulder 52 in the bore 50. The ring 82 is clamped into position when the nozzle 14 is forced into the counter bore 32 of the main body 12 far enough for the ring 82 to engage shoulder 88 on the end of counter bore 32. The edge of the diaphragm 24 is protected by means of the shoulder 86 on the ring 82 which engages the upper end of the nozzle 14. This prevents overstressing of the edge of the diaphragm when the nozzle 14 is locationally fit into bore 32 in the main body 12. The main body is staked at a number of circumferential locations 15 around nozzle 14.

It should be noted that the knurled section 47 and the slots 85 in ring 82 form diverse flow paths 26 into the bore 20. With this arrangement, pressure fluctuations encountered in the oil pressure are throttled to better control the pressure in the bore 20.

The Hall effect sensor assembly 28 used in the Van Fossen, et al. device and which is used in the present invention is of the type shown and described in U.S. Pat. No. 4,606,229 entitled "Differential Pressure Transmitter," issued on Aug. 18, 1986 and assigned to the assignee of the present invention. This type of sensor includes a transducer 90 which includes a panel support 91 having a planar face 92 and a sensing face 94 on which is disposed a sensing element 96. The transducer 90 is positioned on the outer diameter of the body in sensing relationship to the magnetic ring 58. The lead wires 98 from the transducer are connected to a circuit board 100 held by the panel support 91. The output signal from the transducer is used to provide a signal indicating a change in the differential pressure between the oil discharge pressure and crankcase pressure. When the oil pump is generating more pressure than the combined forces of the tension spring and the crankcase pressure, the carrier assembly 18 will be in the lowermost position indicating normal lubricating pressure. When the differential pressure decreases so that the combined forces of the tension spring and crankcase pressure move the carrier upward, the transducer will initially provide a warning signal indicating the change and will indicate the need to the electronic controller to turn the compressor off if there is a loss of lubricating pressure.

It should be noted that the rod 54 and magnet 58 are suspended between the tension spring 22 and the diaphragm 24. The response of the carrier assembly 18 to pressure changes is thereby immediate and not impeded by any physical contact with any other structure. The magnet 58 is in the form of a ring so that the carrier can be mounted in any position within the chamber 20 without any change in the response characteristic of the transducer 90.

Figure 4:
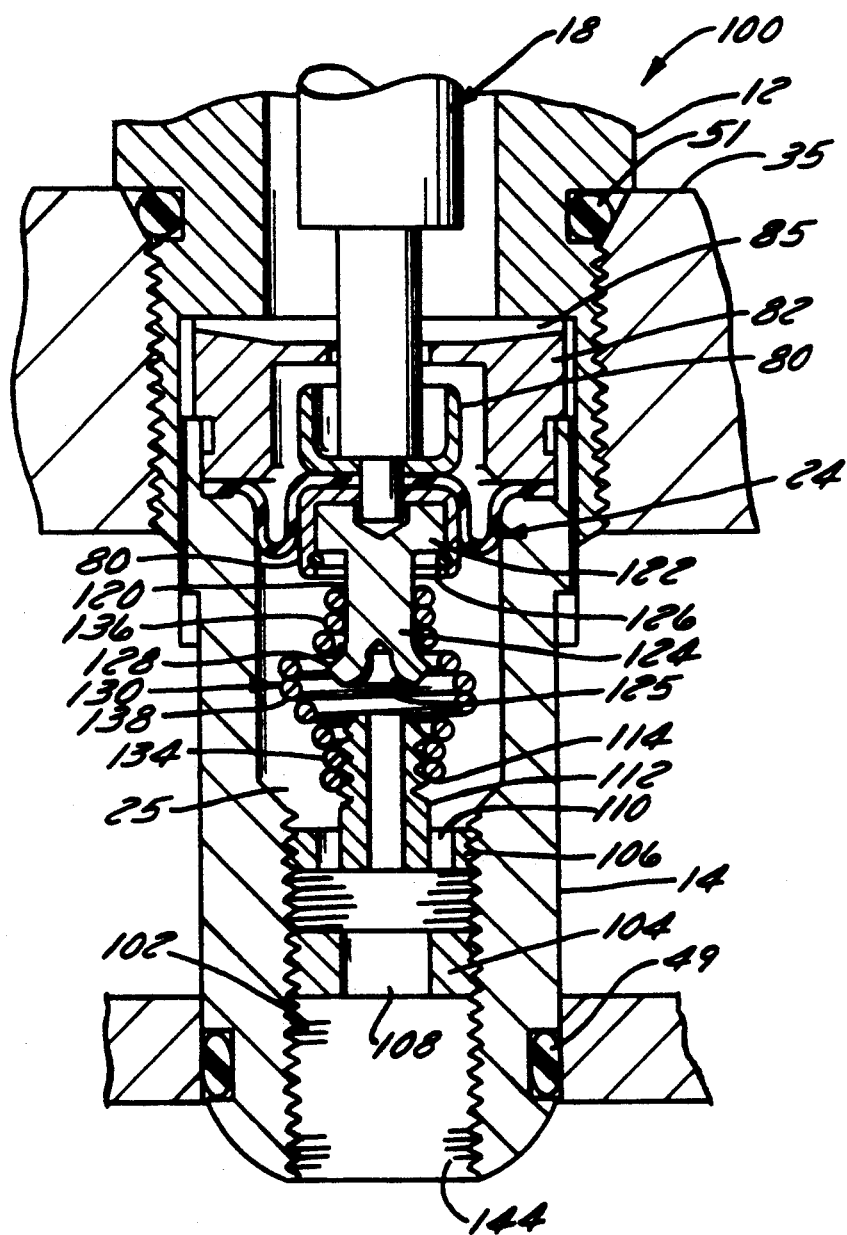
FIG. 4 is a partial sectional view similar to FIG. 1, but illustrating modifications according to the preferred embodiment of the present invention.
Figure 5:
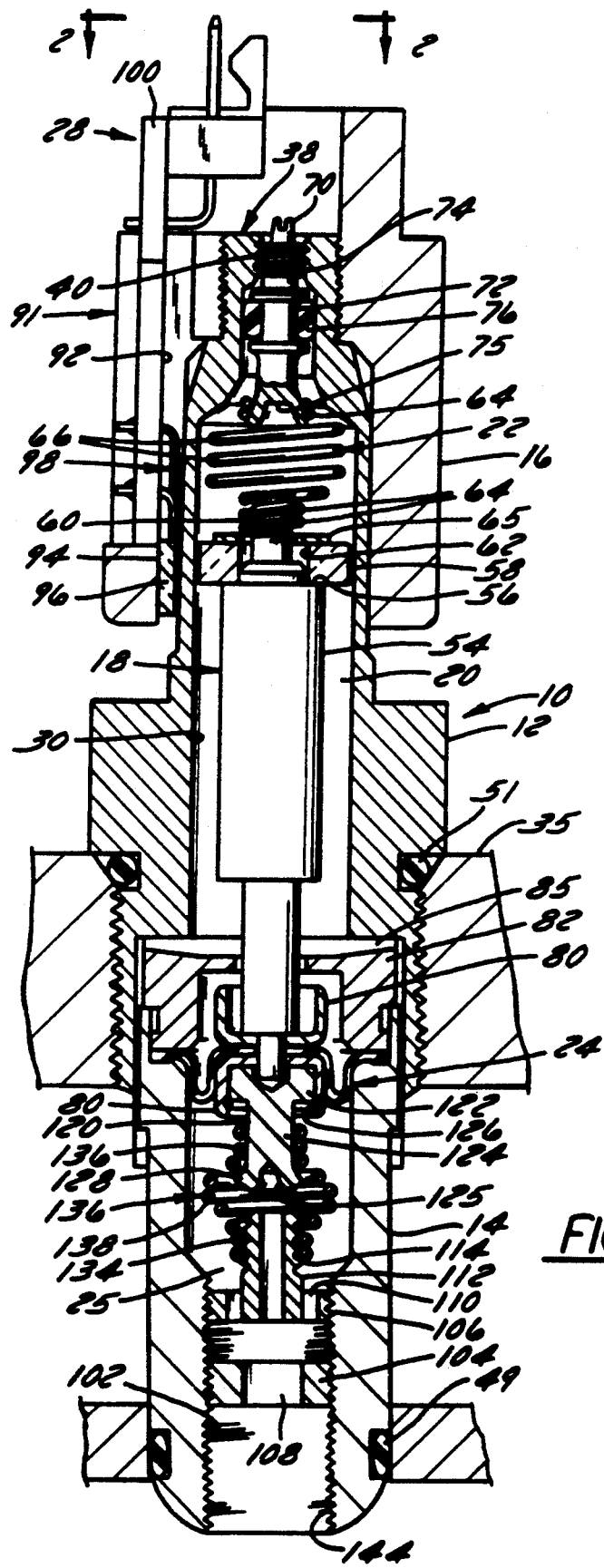
FIG. 5 is a cross-sectional view of a pressure sensor according to a preferred embodiment of the present invention.

Dealing next with FIGS. 4 and 5, modifications of the sensor 10 which result in the sensor 100 of the present invention are shown. Only the lower section, i.e. that in the vicinity of nozzle 14, is shown in FIG. 4.

First, it is noted that bore 144 is expanded when compared to bore 44 in the previous FIGURES and includes a threaded portion 102 adjacent chamber 25. Disposed within portion 102 is an extension spring tension screw 104 which is threaded on its outer surface 106 to cooperate with the threading of portion 102. Screw 104 includes an axial bore 108 at its lower end which splits into other through bores 110 along its length to allow the fluid pressure within bore 144 to be noted and to prevent interference with the fluid readings in chamber 25 as previously described.

A protrusion 112 extends upwardly from screw 104 which, on its upper end, is threaded at 114. Sensor 100 of the present invention is also modified when compared to the prior device, by providing a spring coupler 120 on the lower retaininer 80, coupler 120 including a first end 122 within retainer 80 and a reduced diameter portion 124 extending downwardly, coaxial with the magnet carrier assembly 18 and with bore 144. Portion 124 includes a blind bore 125 at its lower end. A spring clip, such as a snap ring 126, is used to secure coupling 120 in place. Portion 124 is flared outwardly at 128 to act as a receiving area for the second tension screw now to be described.

A second tension spring 130 is threadingly attached to tension screw 104 and the blind bore expantion 128 of coupler 120 using first and second reduced diameter coil ends 134 and 136, respectively, while the intermediate and larger coils 138 are located between these two elements. The expansion 128 turns within the coils of spring 30 for adjusting the spring tension.

From this description, it will be appreciated that a second and new adjustment is available for sensor 100 which allows it to provide the features described earlier in this specification. By appropriate adjustment of the tension screw 104 and adjustment screw 70, the position of the retainer pair 80 and hence, the position of magnet carrier 54, can be varied within chamber 25. With no pressure applied the diaphragm can be positioned at any location within its mechanical stroke. The sensor 100 can measure vacuum only (i.e. negative pressure only) when the screws are adjusted so that the diaphragm is at the lowermost position in its potential stroke range. Positive pressure only is measured when the diaphragm is set as shown in FIG. 1, and either positive or negative pressures can be measured if the diaphragm is set at an intermediate location. The advantages of such flexibility in operation have been previously described in the background section of this specification, one of which is the ability to detect negative pressure upon start-up of a screw compressor. In this case, the output from the Hall effect sensor would be directed to a logic circuit (not shown) to shut the compressor off until corrective action was taken. On the other hand, if the Hall effect sensor noted positive pressure upon start-up, the compressor would be allowed to continue to operate.

While one particular application has been referred to in the specification, sensor 100 could be employed in any environment where it would be desirable to be able to sense either positive or negative pressures and, accordingly, the illustrated use environment should not be considered as limiting. While the invention has been described in connection with a specific embodiment, it is intended to embrace all alternatives, modifications and equivalents which become apparent to those skilled in the art and which fall within the spirit and scope of the appended claims.

What is claimed is:

1. A differential pressure sensing device for monitoring a pressure differential comprising:
   a housing having a high pressure chamber;
   a nozzle on said housing having a low pressure chamber;
   a slidable diaphragm separating said high pressure chamber from said low pressure chamber;
   a first tension spring mounted in said high pressure chamber;
   a second tension spring mounted in said low pressure chamber;
   a magnet carrier disposed between said first and second tension springs, said magnet carrier connecting one of said first or second tension springs to said diaphragm;
   means in said device for connecting said high pressure chamber to a source of pressure;
   means in said device for connecting said low pressure chamber to a source of lower pressure; and
   means for sensing the axial position of said magnet carrier assembly.

2. The device according to claim 1 wherein said magnet carrier includes a ring magnet.

3. The device according to claim 1 including means for adjusting the differential pressure response.

4. The device according to claim 1 wherein said high pressure connecting means includes a knurled section defining a high pressure flow path to said high pressure chamber.

5. The device according to claim 1 including means for limiting the motion of said magnet carrier.

6. The device according to claim 5 wherein said limiting means includes a retainer mounted on each side of said diaphragm for sealing said diaphragm.

7. A pressure differential sensor comprising:
   a housing;
   a chamber in said housing;
   means mounted on one end of said housing for connecting said chamber to a high pressure source;
   a diaphragm for separating said chamber, said diaphragm having a first side and a second side;
   means in said sensor for exposing said first side of the diaphragm to a high pressure source;
   means in said sensor for exposing said second side of the diaphragm to a lower pressure source;
   a rod arranged to respond to movement of said diaphragm;
   a first tension spring disposed on one of said first or second sides of said diaphragm connecting said rod to said housing whereby said rod is centered and free to move with said diaphragm;
   a second tension spring coupled to the other of said first or second sides of the diaphragm; and
   means on said rod for indicating the position of said rod.

8. The sensor according to claim 7 including means for monitoring the position of said indicating means.

9. The sensor according to claim 7 including means for adjusting the tension of both said first and second tension springs to vary the response characteristic of said rod.

10. A differential pressure sensor comprising:
    a housing having a chamber;
    a threaded opening at one end of said chamber;
    a nozzle mounted in said housing at the other end of said chamber;
    a spindle positioned in said chamber;
    a diaphragm having a first side and a second side, said diaphragm being mounted on one end of said spindle and being connected to said nozzle to define a low pressure chamber in said nozzle on said first side of the diaphragm and a high pressure chamber in said housing on said second side of the diaphragm, said spindle being connected to the nozzle by a first tension spring;
    a second tension spring on said second side of said diaphragm adjustably coupled to the housing;
    a magnet on said spindle; and
    means for sensing the position of said magnet.

11. The sensor according to claim 10 wherein said nozzle includes a knurled section for defining a flow path into said high pressure chamber and a bore through said nozzle for defining a flow path into said low pressure chamber.

12. A pressure sensing device for monitoring the pressure differential between the lubricating oil discharge pressure and the crankcase pressure in a compressor, said device comprising:
    a housing having a chamber;
    a device mounted on said housing, said device including passage means for connecting said chamber to the discharge pressure and a bore in said device connected to said crankcase;
    a diaphragm in said housing separating said chamber from said bore;
    a spindle mounted in said chamber and being connected to said diaphragm;
    a first tension spring connected to said spindle and to said housing;
    a second tension spring connected to the housing, whereby said spindle is suspended in said chamber between said diaphragm and said springs; and
    means for adjusting the location of the diaphragm within the sensing device by adjustment of the tension on the springs.

* * * * *